Figure 1:
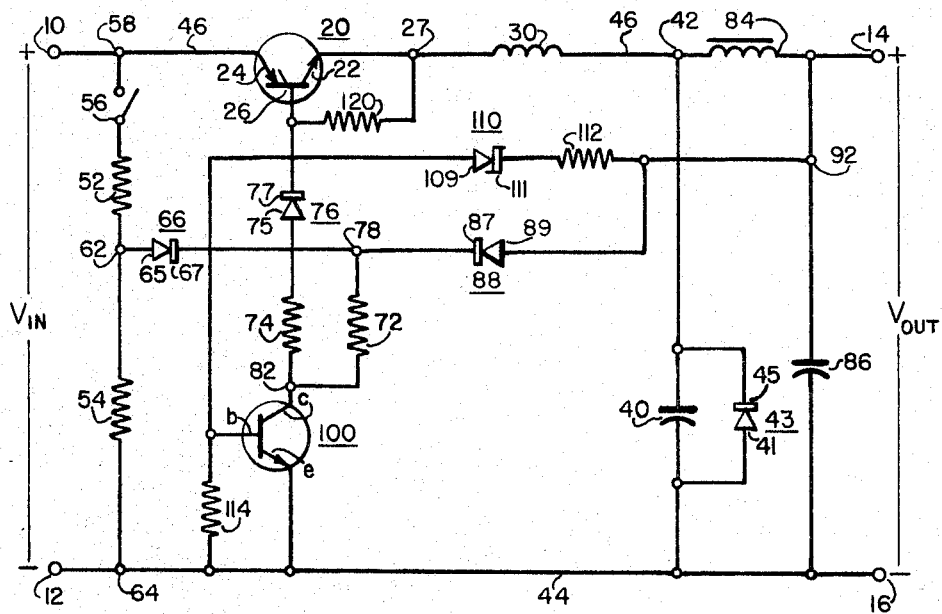

Aug. 9, 1966     L. A. SCHLABACH     3,265,956

ELECTRICAL APPARATUS

Filed Nov. 20, 1962

WITNESSES
Theodore F. Wrobel
Donald R. Lackey

INVENTOR
Leland A. Schlabach
BY
F. E. Browder
ATTORNEY

United States Patent Office 3,265,956
Patented August 9, 1966

3,265,956
ELECTRICAL APPARATUS
Leland A. Schlabach, Wilkins Township, Allegheny County, Pa., assignor to Westinghouse Electric Corporation, Pittsburgh, Pa., a corporation of Pennsylvania
Filed Nov. 20, 1962, Ser. No. 238,869
3 Claims. (Cl. 323—22)

This invention relates in general to power supplies and more particularly to voltage regulated direct current power supplies.

In equipment which operates from a high voltage direct current or unidirectional source, it is often necessary to provide a lower direct current voltage for other circuit functions. Most prior art methods for supplying the lower direct current voltages have proven to be inefficient or unregulated, or both.

It is, therefore, desirable that a direct current power supply be provided that has a good efficiency, regulated output voltage and a high degree of reliability.

Accordingly, it is a general object of this invention to provide a new and improved direct current power supply.

It is a more particular object of this invention to provide a new and improved direct current power supply that has a regulated output.

Another object of this invention is to provide a direct current power supply having a high efficiency.

A still further object of this invention is to provide a direct current power supply that will limit the maximum output current to a safe value.

Briefly, the present invention accomplishes the above cited objects by providing a direct current power supply utilizing a silicon controlled rectifier in conjunction with a series inductance-capacitance circuit. This series circuit provides a uniform or fixed condition period determined by the natural frequency of the inductance-capacitance circuit. The repetition rate of the conduction periods is determined by a voltage sensing and control circuit to produce the desired unidirectional output voltage or current.

More specifically, when a control signal is impressed upon the control electrode or gate of the controlled rectifier, the controlled rectifier allows current to flow in the series inductance-capacitance circuit. The stored energy of this series circuit causes the voltage on the capacitor to overshoot to a greater value than the voltage input, and the current, therefore, tends to reverse its direction through the controlled rectifier, dropping the current through the controlled rectifier to zero. When the current through the controlled rectifier falls below a value called the holding current, the gate or control electrode regains control and the controlled rectifier will not conduct until another signal is impressed upon the gate. When the controlled rectifier stops conducting, the voltage stored in the capacitor is applied to the output terminals in the form of a unidirectional voltage pulse. The control or sensing circuit takes energy from the output terminals to initiate the control signal that is applied to the gate of the controlled rectifier and the repetition rate or frequency of the control signal depends upon whether the output voltage is above, below, or at the predetermined output voltage. A parallel resistor-rectifier feedback combination overrides the voltage sensing control when the output current becomes excessive and limits the output voltage to a magnitude that will provide a safe value of output current.

Further objects and advantages of this invention will become apparent as the following description proceeds and features of novelty which characterize the invention will be pointed out in particularity in the claims annexed to and forming a part of this specification.

Figure 2:
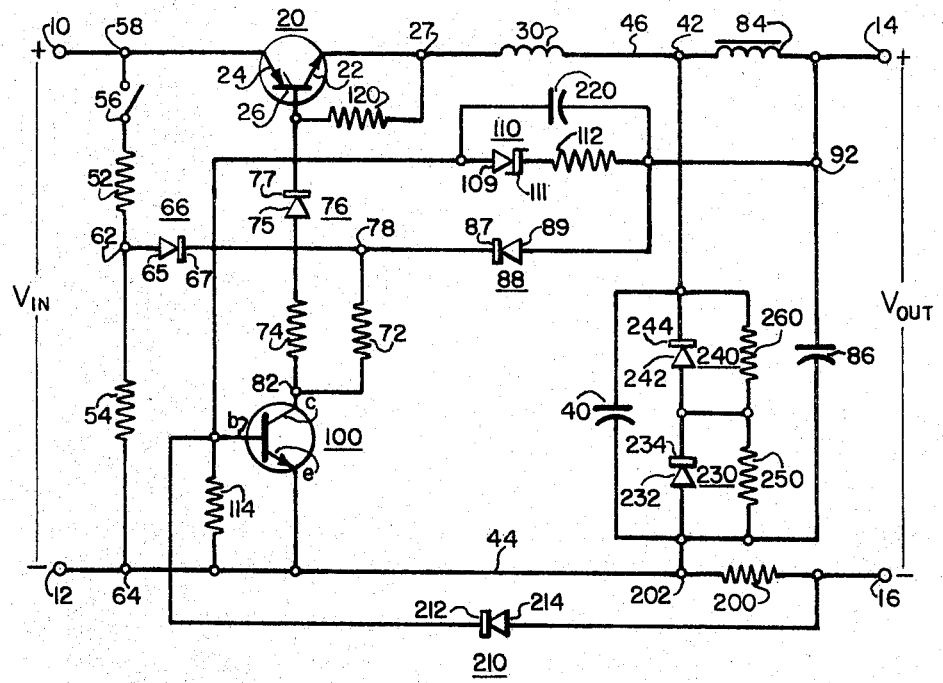

For a better understanding of the invention, reference may be had to the accompanying drawings in which:

FIGURE 1 is a schematic diagram illustrating one embodiment of this invention; and FIG. 2 is a schematic diagram illustrating a second embodiment of this invention.

Referring now to the drawings, and FIG. 1 in particular, there is illustrated the basic unidirectional power supply having input terminals 10 and 12, and output terminals 14 and 16. Controlled rectifier 20, which may be a silicon controlled rectifier, includes two main electrodes and a control electrode, or more specifically, a cathode 22, an anode 24 and a gate 26. Controlled rectifier 20 is connected in a series circuit relationship with inductor 30 and capacitor 40. More specifically, the anode 24 of controlled rectifier 20 is connected to positive input terminal 10 through positive bus 46 and the cathode 22 of controlled rectifier 20 is connected to one side of inductor 30. The other side of inductor 30 is connected to one side of capacitor 40 at terminal 42 and the remaining side of capacitor 40 is connected to the negative terminal 12 through negative bus 44. This series circuit provides the dual function of forming unidirectional pulses of a duration determined by the natural frequency of the inductance-capacitance resonant combination, and of delivering these pulses to the output terminals 14 and 16 through positive and negative buses 46 and 44 respectively. In other words, when a unidirectional voltage $V_{in}$ is impressed across input terminals 10 and 12 and controlled rectifier 20 allows current to flow in response to a control signal, which will be discussed in detail hereinafter, current will flow through the series circuit comprising inductance 30 and capacitance 40. This series circuit is highly reactive and consequently the voltage buildup on the capacitor 40 will overshoot and exceed the voltage input $V_{in}$. Since the voltage on the capacitance 40 exceeds the input voltage, current will tend to reverse through the controlled rectifier 20. When the current through the controlled rectifier 20 reaches zero, or a value below the holding current of the controlled rectifier, the gate 26 of the controlled rectifier 20 will regain control and controlled rectifier 20 will no longer allow conduction. The gate loses control once it has initiated conduction and the current through the controlled rectifier must drop to a very small value before control will be regained and conduction stopped. This control is regained by the gate when the current through the controlled rectifier 20 becomes less than the holding current due to the voltage buildup on the capacitor 40 reaching a value greater than the input voltage $V_{in}$. When the controlled rectifier is in the conducting state, power is applied to both the inductor 30 and the capacitor 40 and then when controlled rectifier 20 regains its forward blocking ability, the charge stored in the capacitor 40 is discharged through inductor 84 to the output terminals 14 and 16 in the form of a unidirectional voltage pulse. The duration of the pulse is nearly a fixed quantity, primarily dependent upon the characteristics of the series circuit devices. Therefore, by varying the frequency of these fixed pulses, it will be appreciated that a large range of direct current voltages may be developed at the output terminals 14 and 16, or, by varying the frequency of the pulses in response to an error signal, a desired or predetermined unidirectional voltage output may be maintained.

A rectifier 43, which may be a semiconductor diode having an anode 41 and a cathode 45 may be connected across the capacitor 40 to prevent the voltage across capacitor 40 from reversing by more than the forward drop of said diode, otherwise, the voltage on capacitor 40 would become quite high in the reverse direction between energy pulses supplied to the output circuit comprising output terminals 14 and 16. Resistors 52 and 54 and switch 56 are connected in a series circuit relationship across the input terminals 10 and 12 in order to form a voltage dividing network and provide a voltage at the junction between the resistors approximately equal to the desired output voltage $V_{out}$. More specifically, one side of switch 56 is connected to the positive direct current bus 46 at junction 58 and the other side of the switch 56 is connected to resistor 52. The remaining side of resistor 52 is connected to one side of resistor 54 at junction 62, and the remaining side of resistor 54 is connected to negative direct current bus 44 at junction 64. Rectifier 66, which may be a semiconductor diode having an anode 65 and a cathode 67, is connected to the junction 62 between resistors 52 and 54. To enable the voltage developed at junction 62 to be applied as a signal to the gate 26 of controlled rectifier 20 and therefore initiate conduction through the anode-cathode circuit of controlled rectifier 20, resistors 72 and 74 and rectifier 76 are connected in a series circuit relationship with the gate 26 of controlled rectifier 20. The anode 65 of rectifier 66 is connected to junction 62 and the cathode 67 is connected to resistor 72 at junction 78. The other side of resistor 72 is connected to one side of resistor 74 at junction 82 and the other side of resistor 74 is connected to rectifier 76. Rectifier 76 may be a semiconductor diode having an anode 75 and a cathode 77, in which case resistor 74 would be connected to the anode 75 of rectifier 76, and the cathode 77 of rectifier 76 would be connected to the gate 26 of controlled rectifier 20. A leakage current path in the form of resistor 120 may be connected from the gate 26 to the junction 27 between the controlled rectifier 20 and the inductor 30. When switch 56 is closed, a voltage is developed at junction 62 and junction 78 approximately equal to the predetermined output voltage. This voltage develops a current which flows through resistors 72 and 74 and rectifier 76 to the gate 26 of controlled rectifier 20. As previously described, when conduction is initiated through controlled rectifier 20, a unidirectional pulse is produced by capacitor 40 which is applied to the output terminals 14 and 16. In order to smooth the output pulses and reduce the ripple in the unidirectional voltage output, a filter network comprising an inductor 84 and a capacitor 86 are connected in circuit relationship with said output terminals. More specifically, inductor 84 is connected into bus 46 between the output terminal 14 and junction 42. Capacitor 86 is connected across the two output terminals 14 and 16.

As hereinbefore stated, the closing of the switch 56 initiates the functioning of the power supply. Switch 56 is only closed momentarily, however, with control signals to sustain the voltage output $V_{out}$ for the gate 26 of controlled rectifier 20 coming from the voltage output $V_{out}$. The feedback of this control signal is accomplished by connecting a rectifier 88, which may be a semiconductor diode 88 having an anode 89 and a cathode 87, between the output circuit, including output terminals 14 and 16, and junction 78. Specifically, the anode 89 of rectifier 88 is connected to the positive direct current output terminal 14 at junction 92. The cathode 87 of rectifier 88 is connected to one side of resistor 72 at junction 78. The remaining circuit to the gate 26 of controlled rectifier 20 has previously been described as the circuit used by the signal received from the voltage dividing circuit comprising resistors 52 and 54. Therefore, the gate signal from the output voltage $V_{out}$ follows the circuit from junction 92 through rectifier 88, resistors 72 and 74, and rectifier 76 to the gate 26 of controlled rectifier 20.

To maintain the output voltage at a predetermined value, the frequency of the pulses generated by the series inductance-capacitance circuit comprising inductor 30 and capacitor 40 must be regulated or controlled. This function is accomplished by the combination of signal translating device or transistor 100 and voltage sensing rectifier 110. More specifically, rectifier 110 may be a semiconductor diode known in the art as a Zener diode and comprising an anode 109 and cathode 111. Zener diode 110 and resistor 112 are connected in a series circuit relationship, with one side of resistor 112 connected to junction 92 and the positive direct current output terminal 14. The other side of resistor 112 is connected to the cathode 111 of Zener diode 110, and the anode 109 of Zener diode 110 is connected to transistor 100. Transistor 100 may be a junction transistor of the NPN type comprising a base electrode $b$, a collector electrode $c$, and an emitter electrode $e$. The base electrode $b$ is connected to anode 109 of Zener diode 110 and also to biasing resistor 114. The other side of resistor 114 is connected to the negative direct current bus 44. The emitter $e$ of transistor 100 is also connected to the negative direct current bus 44 and the collector electrode $c$ is connected to junction 82. The output voltage $V_{out}$ is limited to the avalanche or breakdown voltage of Zener diode 110 and the resistor 112 in combination. The values of these devices are so selected that when the predetermined output voltage $V_{out}$ is exceeded, Zener diode 110 will break down and conduct current in its reverse or normally blocking direction. When the voltage output $V_{out}$ reaches a point where Zener diode 110 breaks down and conducts current through the base emitter path of transistor 100 to the negative direct current bus 44, transistor 100 saturates and allows saturation current to flow through its collector-emitter path. Upon saturation, transistor 100 is no longer a high impedance device, but has a very low impedance and low voltage drop. Consequently, the gate signals, upon reaching junction 82 and the collector electrode $c$ of transistor 100, follow the low impedance path presented by the transistor 100 to the negative direct current bus 44. Therefore, the gate drive signals do not restart the conduction of the controlled rectifier 20 during the portion of the time the transistor 100 is saturated. When controlled rectifier 20 stops conducting, the voltage output $V_{out}$ begins to fall and the Zener diode 110 regains blocking control in its reverse direction when the voltage $V_{out}$ falls below the Zener diode breakdown voltage. When Zener diode 110 ceases to conduct, transistor 100 comes out of saturation and again presents a high impedance in the circuit and again allows the control signals to reach the gate 26 of controlled rectifier 20 through the rectifier 88, resistors 72 and 74, and rectifier 76 circuit to the gate 26 of controlled rectifier 20.

Thus, the Zener diode 110 and transistor 100 combination are so connected as to control the frequency of unidirectional pulses generated by the reactive series circuit comprising the controlled rectifier 20, inductor 30, and capacitor 40, and, therefore, control the voltage output $V_{out}$ and maintain it at a predetermined magnitude.

The operation of the complete basic regulated power supply circuit will now be described. The input terminals 10 and 12 are connected to a source of unidirectional output voltage $V_{in}$ having a higher potential than the desired value of the regulated output voltage $V_{out}$. The input voltage $V_{in}$ may vary over a considerable range. Switch 56 is momentarily closed applying a voltage, having a magnitude approximately equal to the predetermined output voltage $V_{out}$, to the gate 26 of controlled rectifier 20 through the circuit comprising rectifier 66, resistors 72 and 74, and rectifier 76. This signal at the gate 26 of controlled rectifier 20 causes controlled rectifier 20 to conduct through the series circuit comprising inductor 30 and capacitor 40. This series circuit is highly reactive, causing the voltage buildup on capacitor 40 to exceed the input voltage $V_{in}$ and hence the current in the series circuit tends to reverse. As soon as the current through the controlled rectifier 20 falls below the holding current, the gate 26 regains control and controlled rectifier 20 will no longer conduct without receiving another control signal at the gate 26. Capacitor 40 then discharges the voltage it has built up through the filter network comprising inductor 84 and capacitor 86 to the output terminals 14 and 16. Switch 56 is now open, so the control signal for gate 26 of controlled rectifier 20 will be derived from the output voltage $V_{out}$ by virtue of rectifier 88 and resistor 72. This succession of unidirectional voltage pulse outputs and control signal inputs continue uninterrupted at a rate determined by the constants of the series circuit devices, the inductor 30 and capacitor 40, and the inductor 84 and capacitor 86, until the predetermined voltage is reached. When the predetermined voltage is reached, the Zener diode 110 breaks down and allows current to flow in its normally blocking direction through the base emitter path of NPN transistor 100. This current flow causes the transistor 100 to saturate and present a low impedance through its collector-emitter path to the negative direct current bus 44. Therefore, when the preset voltage is exceeded, the transistor 100 shunts the gate control signals from junction 82 to the negative direct current bus 44. The controlled rectifier 20 does not conduct during this period, allowing the output voltage $V_{out}$ to fall. As soon as the output voltage $V_{out}$ falls below the breakdown voltage of the Zener diode, the Zener diode 110 will regain control and block conduction in its reverse direction. With current no longer flowing through its base-emitter path, transistor 100 will come out of saturation and no longer act as a short circuit for the gate control signals, and voltage output $V_{out}$ will again rise until the Zener diode breaks down. This action occurs very rapidly and a frequency of output pulses is thereby automatically established that will maintain the output voltage $V_{out}$ at the predetermined value.

The basic circuit shown in FIG. 1 is automatically protected from a short circuit across the output terminals 14 and 16, since the signals for the gate 26 of the controlled rectifier 20 are received from the voltage output $V_{out}$. When $V_{out}$ falls to zero because of a short circuit across the terminals of the power supply there is no longer any drive or control signal for the gate 26 of controlled rectifier 20, hence the circuit ceases to function. It will be appreciated that if this short circuit feature is not desired, the basic circuit shown in FIG. 1 may be modified by eliminating the rectifier 88 and the switch 56. Resistor 52 would then be permanently connected to junction 58 and the drive signal for the gate 26 of controlled rectifier 20 would always be received from the input voltage $V_{in}$.

FIG. 2 illustrates the basic circuit of FIG. 1 with some modifications that may be desirable. Like reference numerals in FIG. 2 refer to similar elements shown in FIG. 1.

Circuit overload protection may be added to protect the basic circuit of FIG. 1 by adding resistor 200 and rectifier 210, which may be a semiconductor diode having an anode 214 and cathode 212. Resistor 200 is connected between the negative direct current terminal 16 and junction 202 and rectifier 210 has its anode 214 connected to negative direct current output terminal 16 and its cathode 212 connected to the base $b$ of transistor 100. If the load current exceeds the value of full load current, the voltage across resistor 200 will exceed the forward voltage drop of rectifier 210, forward biasing transistor 100 and turning it on. Consequently, control signals at junction 82 will go through the collector-emitter path of transistor 100 instead of to the gate 26 of controlled rectifier 20, and the controlled rectifier 20 will receive only sufficient drive signals to supply full load current to output terminals 14 and 16, rather than sufficient drive signals to maintain the output voltage at the predetermined level. Also, similar to the circuit of FIG. 1, the circuit shown in FIG. 2 will protect itself in case of a short circuit across the output terminals 14 and 16 since the drive or signal for the gate 26 of controlled rectifier 20 is derived from the output voltage $V_{out}$. Under short circuit conditions $V_{out}$ drops to zero and controlled rectifier 20 will no longer conduct and hence will not attempt to supply current to the short circuit.

Capacitor 220 may be connected across the reference Zener diode 110 and the series resistor 112 to reduce the transient feedback impedance and therefore increase the transient feedback. Capacitor 220 limits the rise of the output voltage $V_{out}$ upon start up and reduces the ripple in the output voltage $V_{out}$.

The rectifiers 230 and 240 and resistors 250 and 260 perform a function similar to the rectifier 43 of FIG. 1. The rectifiers 230 and 240 keep the voltage across capacitor 40 from reversing by more than the forward drop of the rectifiers. Otherwise, the voltage on capacitor 40 would become quite high in the reverse direction between energy pulses supplied to the inductor 30 and capacitor 40. The resistors 250 and 260 force the reverse voltage of the rectifiers 230 and 240 to be divided evenly. Rectifiers 230 and 240 may be semiconductor diodes each comprising an anode and a cathode. The anode 232 of rectifier 230 is connected to negative bus 44 at junction 202. The cathode 234 of rectifier 230 is connected to the anode 242 of rectifier 240. The cathode 244 of rectifier 240 is connected to positive direct current bus 46 at junction 42. The resistor 250 has one side connected to the anode 232 of rectifier 230 and its other side is connected to one side of resistor 260. The other side of resistor 260 is connected to the cathode 244 of rectifier 240. A connection is also made between the junction of resistors 250 and 260 and the junction of rectifiers 230 and 240.

In the operation of the circuit shown in FIG. 2, a unidirectional voltage $V_{in}$ having a magnitude greater than the desired voltage $V_{out}$ is applied to input terminals 10 and 12 and the switch 56 is momentarily closed. The closing of switch 56 provides a gate drive signal to the gate 26 of controlled rectifier 20 through resistor 52, rectifier 66, resistors 72 and 74, and rectifier 76. The voltage dividing resistors 52 and 54 provide a gate signal having a magnitude approximately equal to the desired output voltage $V_{out}$. Upon receiving the signal at the gate 26, the controlled rectifier 20 will conduct a current through its anode-cathode path and through the series circuit comprising inductor 30 and capacitor 40. Once conduction through controlled rectifier 20 is initiated, the gate 26 loses control and the controlled rectifier 20 will continue to conduct, even in the absence of a signal at its gate 26. Because of the high reactance of this series circuit, the voltage on capacitor 40 overshoots to a value greater than the input voltage $V_{in}$. This higher voltage on capacitor 40 tends to reverse the current flow through controlled rectifier 20 driving the current to zero. Once the current through controlled rectifier 20 falls below its holding current, the gate 26 regains control and blocks any further current flow through controlled rectifier 20 until another control signal is received at its gate 26. The capacitor 40 discharges into the filter network comprising inductor 84 and capacitor 86, and a filtered unidirectional pulse is delivered to the output terminals, 14 and 16. After a number of these pulses are delivered to the output terminals, a portion of the output current is fed back to be used as the gate drive signal to sustain continued operation of the circuit. This current feedback begins when the voltage at junction 92 exceeds that at junction 62. Once the voltage at junction 92 becomes high enough to supply gate signals for the controlled rectifier 20, the switch 56 may be opened.

This feedback pulse is picked up at junction 92 and goes through rectifier 88, resistors 72 and 74, and rectifier 76. This action of delivering pulses repeats until the voltage $V_{out}$ builds up to the predetermined value determined by the Zener diode 110 and resistor 112. When the reverse voltage across the Zener diode 110 exceeds the avalanche or breakdown voltage, current is allowed to flow through the base-emitter path of transistor 100, turning transistor 100 on and driving it to saturation. At saturation, the collector-emitter path has practically no impedance and, therefore, a very small voltage drop. The drive signals for the gate 26 are, therefore, shunted from junction 82 through the collector-emitter path of transistor 100 to the negative direct current bus 44. The output votlage $V_{out}$ then falls below the value needed to break down the Zener diode 110, and said diode regains its reverse current blocking ability. The current through the base-emitter path ceases and transistor 100 is cut off, returning it to a high impedance state, and the gate drive signals are allowed to reach gate 26 of controlled rectifier 20. If the load current exceeds a safe value, the voltage drop across resistor 200 exceeds the forward voltage drop of rectifier 210 forward biasing the base-emitter circuit of transistor 100, turning said transistor on, and controlled rectifier 20 receives only sufficient drive signals to supply full load current at the output rather than to maintain $V_{out}$ at the predetermined value.

A unidirectional power supply built in accordance with the teachings of this invention provided a well regulated 75±2 volts output with little ripple content over a wide range of load. This regulated output was maintained even though the input direct current voltage to the power supply varied from 210 to 355 volts.

It will, therefore, be apparent that there has been disclosed a unidirectional power supply having a well regulated output from a reliable, self-protecting circuit. Also, since few heat generating devices are used, a unidirectional power supply is disclosed having a high efficiency.

Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

I claim as my invention:

1. A power supply comprising input terminals for connection to a direct current voltage source, output terminals for supplying a regulated direct current voltage to a load circuit, a controlled rectifier having main electrodes and a control electrode, inductance means, capacitance means the main electrodes of said controlled rectifier, said inductance means and said capacitance means being serially connected to said input terminals, said output terminals being connected across said capacitance means, control signal means comprising resistance means and rectifier means connecting the control electrode of said controlled rectifier with said input terminals to obtain control signals for switching said controlled rectifier from a non-conductive state to a conductive state, said inductance and capacitance means being selected to cause said capacitance means to be charged to a greater voltage magnitude than said source voltage when said controlled rectifier switches to its conductive state, causing said controlled rectifier to switch back to its non-conductive state and allow said capacitance means to apply a direct current voltage pulse to said output terminals, a transistor having base, collector, and emitter electrodes, voltage sensing means for producing an error signal when the voltage at said output terminals exceeds a predetermined magnitude, said voltage sensing means including a Zener diode connected between said output terminals and the base electrode of said transistor, the collector and emitter electrodes of said transistor being connected in circuit relation with said control signal means such that when said voltage sensing means applies an error signal to said transistor the control signals from said control signal means will be shunted through said transistor away from said controlled rectifier.

2. A power supply comprising input terminals for connection to a direct current voltage source, output terminals for supplying a regulated direct current voltage to a load circuit, a controlled rectifier having main electrodes and a control electrode, inductance means, capacitance means, the main electrodes of said controlled rectifier, said inductance means and said capacitance means being serially connected to said input terminals, said output terminals being connected across said capacitance means, first control signal means comprising resistance means and rectifier means connecting the control electrode of said controlled rectifier with said input terminals for a predetermined period of time upon start-up of the power supply, second control signal means comprising rectifier means connecting said output terminals in circuit relation with said first control signal means, said first and second control signal means providing control signals for switching said controlled rectifier from a non-conductive state to a conductive state, said inductance and capacitance means being selected to cause said capacitance means to be charged to a greater voltage magnitude than said source voltage when said controlled rectifier switches to its conductive state, causing said controlled rectifier to switch back to its non-conductive state and allow said capacitance means to apply a direct current voltage pulse to said output terminals, a transistor having base, collector, and emitter electrodes, voltage sensing means for producing an error signal when the voltage at said output terminals exceeds a predetermined magnitude, said voltage sensing means including a Zener diode connected between said output terminals and the base electrode of said transistor, the collector and emitter electrodes of said transistor being connected in circuit relation with said first and second control signal means such that when said voltage sensing means applies an error signal to said transistor, the control signals from said first and second control signal means will be shunted through said transistor away from said controlled rectifier.

3. A power supply comprising input terminals for connection to a direct current voltage source, output terminals for supplying a regulated direct current voltage to a load circuit, a controlled rectifier having main electrodes and a control electrode, inductance means, first capacitance means, the main electrodes of said controlled rectifier, said inductance means and said first capacitance means being serially connected to said input terminals, said output terminals being connected across said first capacitance means, first control signal means comprising resistance means and rectifier means connecting the control electrode of said controlled rectifier with said input terminals for a predetermined period of time upon start-up of the power supply, second control signal means comprising rectifier means connecting said output terminals in circuit relation with said first control signal means, said first and second control signal means providing control signals for switching said controlled rectifier from a non-conductive state to a conductive state, said inductance and first capacitance means being selected to cause said first capacitance means to be charged to a greater voltage magnitude than said source voltage when said controlled rectifier switches to its conductive state, causing said controlled rectifier to switch back to its non-conductive state and allow said first capacitance means to apply a direct current voltage pulse to said output terminals, a transistor having base, collector, and emitter electrodes, voltage sensing means for producing an error signal when the voltage at said output terminals exceeds a predetermined magnitude, said voltage sensing means including a Zener diode connected between said output terminals and the base electrode of said transistor, second capacitance means, said second capacitance means being connected across said Zener diode to improve system response time, the collector and emitter electrodes of said transistor being connected in circuit relation with said first and second control signal means such that when said voltage sensing means applies an error signal to said transistor, the control signals from said first and second control signal means will be shunted through said transistor away from said controlled rectifier.

References Cited by the Examiner

UNITED STATES PATENTS

| 2,776,382 | 1/1957 | Jensen | 323—22 |
| 3,040,183 | 6/1962 | Farnsworth | 323—22 X |
| 3,085,190 | 4/1963 | Kearns | 321—45 |
| 3,120,633 | 2/1964 | Genuit | 321—45 |

OTHER REFERENCES

Notes on the Application of the Silicon Controlled Rectifier: published by the Semiconductor Products Department of the General Electric Corporation; December 1958, pp. 54–57 are relied on.

JOHN F. COUCH, *Primary Examiner*.

MILTON O. HIRSHFIELD, *Examiner*.

K. HADLAND, K. D. MOORE, *Assistant Examiners*.